US006292045B1

United States Patent
Bongiorno et al.

(10) Patent No.: US 6,292,045 B1
(45) Date of Patent: Sep. 18, 2001

(54) CIRCUIT AND METHOD FOR DETECTING AND SELECTING CLOCK SOURCES

(75) Inventors: Robert A. Bongiorno, North Wales, PA (US); Kenneth Low, Campbell; Shiyan Pei, San Jose, both of CA (US)

(73) Assignee: ZiLOG, Inc., Campbell, CA (US)

( * ) Notice: Subject to any disclaimer, the term of this patent is extended or adjusted under 35 U.S.C. 154(b) by 0 days.

(21) Appl. No.: 09/450,263

(22) Filed: Nov. 29, 1999

(51) Int. Cl.[7] .................................................. G06F 1/04
(52) U.S. Cl. ............................................. 327/298; 327/4.7
(58) Field of Search .................................. 327/298, 291, 327/407, 408, 18, 19, 22, 23, 99

(56) References Cited

U.S. PATENT DOCUMENTS

| 4,229,699 | * | 10/1980 | Frissell | 327/114 |
| 5,483,185 | * | 1/1996 | Scriber et al. | 327/99 |
| 5,608,425 | | 3/1997 | Movshovich | 345/141 |
| 5,623,223 | * | 4/1997 | Pasqualini | 327/298 |
| 5,805,909 | | 9/1998 | Diewald et al. | 395/750.04 |

* cited by examiner

*Primary Examiner*—Timothy P. Callahan
*Assistant Examiner*—Linh Nguyen
(74) *Attorney, Agent, or Firm*—Skjerven, Morrill, MacPherson, LLP (57) ABSTRACT

A circuit for detecting and selecting one of clock signals of at least two clock sources, is provided. The circuit is coupled to the available clock sources so as to receive their clock signals. The circuit is programmable to choose one of the clock signals designated by a programmed code. Then, the circuit [1] selects the designated clock signal when it has been received and [2] automatically selects the undesignated clock signal when the designated clock signal has not been received and when the undesignated clock signal has been received. Thereafter, the circuit provides the selected clock signal to any device that requires a clock signal in order to operate.

26 Claims, 6 Drawing Sheets

CIRCUIT AND METHOD FOR DETECTING AND SELECTING CLOCK SOURCES

FIELD OF THE INVENTION

The present invention relates electrical circuits. More specifically, the present invention relates to a circuit that detects and selects clock sources.

BACKGROUND OF THE INVENTION

Today computers, microwaves, televisions, cellular phones, automobiles and other appliances and machines usually contain at least one microprocessor or microprocessor-based chip that essentially acts as their "brain" to perform arithmetic and logic and to control operations. The operation of the microprocessor is synchronized by internal or external clocking, or both, from pulses generated by various types of clock sources such as a crystal oscillator, a crystal resonator, a complementary metal-oxide semiconductor (CMOS) clock, a resistor-capacitor (RC) oscillator and an inductor-capacitor (LC) oscillator. Typically, either the crystal oscillator or crystal resonator is chosen to provide clock pulses because they are capable of generating very accurate and stable electric signal frequencies.

To guard against a control failure or a system lockup that may be invoked by electrical noise, electrostatic discharge, power glitches, software hang up or clock failure, the microprocessor-based chip contains a watchdog timer that prevents equipment faults or a computer program from looping endlessly or becoming idle because of program errors. In operation, the watchdog timer would generate and send out a signal to reset the microprocessor and to disable the microprocessor-based chip after a pre-set time-out period has elapsed during which the microprocessor-based chip has experienced such control failure or system lockup. This time-out period may range from nanoseconds, microseconds, milliseconds, seconds, minutes, hours or days, depending on a particular application.

Similar to the microprocessor of the microprocessor-based chip, the watchdog timer within such chip also requires a clock signal having clock pulses in order to function. Both the microprocessor and the watchdog timer may receive clock pulses from the same clock source or separate clock sources, depending on a particular microprocessor-based system. In a microprocessor-based system where both the microprocessor and watchdog timer share the same clock source such as a crystal controlled oscillator, if the crystal is dislodged while such system is operating within a harsh environment, the watchdog timer would not be able to reset the microprocessor and to disable the microprocessor-based chip. As a result, accidents may occur.

For example, a microprocessor-based chip having a watchdog timer may be installed within a garage door opening and closing system in order to control motor operations of such system to open and close the garage door. In this garage door opening and closing system, both the microprocessor and the watchdog timer are clocked by the same clock source. While the garage door is closing, the clock source may malfunction and thus would fail to provide any clock pulses. If so, the garage door would continue to move downward and towards the ground because the watchdog timer has become inoperative and thus could not send out a reset signal to effectively stop the downward movement of the garage door. If there is an object such as a car locating between the bottom horizontal edge of the garage door and the ground, such horizontal bottom edge would damage the car due to the weight and downward movement of the garage door. This is obviously undesirable.

Other conventional microprocessor-based systems may have more than one clock source. In these systems, both the microprocessor and the watchdog timer may be clocked separately by different clock sources. If two available clock sources are selected to separately clock the microprocessor and the watchdog timer, such selections are fixed. Thus, when the clock source providing clock pulses to the microprocessor is broken and the clock source providing clock pulses to the watchdog timer is not broken, the watchdog timer is able to generate and send out a reset signal but the microprocessor is unable to operate. In addition, when the clock source providing clock pulses to the watchdog timer is broken and the clock source providing clock pulses to the microprocessor is not broken, the microprocessor-based system has no protection against a system malfunction that would have been detected by a functioning watchdog timer. As a result, accidents or other undesirable effects may follow.

SUMMARY OF THE INVENTION

Based on the above discussion, it is therefore a general object of the present invention to provide a circuit for coupling between at least two clock sources and any device that requires clock pulses in order to operate. This circuit ensures that clock pulses from one of the clock sources are provided to such device as long as one of the clock sources is operating.

It is another object of the present invention to provide a circuit for coupling between at least two clock sources and [1] a timer of a microprocessor-based system or [2] a microprocessor of such microprocessor-based system. This circuit effectively protects the microprocessor-based system from a control failure, a system lockup, equipment faults and other malfunctions by ensuring that clock pulses are provided to the timer or the microprocessor as long as one of the clock sources is operating.

The circuit is programmable to choose one of the clock signals designated by a programmed code. Then, the circuit [1] selects the designated clock signal when it has been received and [2] automatically selects the undesignated clock signal when the designated clock signal has not been received and when the undesignated clock signal has been received. Thereafter, the circuit provides the selected clock signal to any device that requires a clock signal in order to operate.

According to one aspect of the present invention, a circuit for detecting and selecting one of clock signals of at least two clock sources is provided. The circuit is coupled to the at least two clock sources so as to receive their clock signals. The circuit is programmable to choose one of the clock signals designated by a programmed code. Then, the circuit [1] selects the designated clock signal when it has been received and [2] automatically selects the undesignated clock signal when the designated clock signal has not been received and when the undesignated clock signal has been received. Thereafter, the circuit provides the selected clock signal to any device that requires a clock signal in order to operate.

According to another aspect of the present invention, a method for detecting and selecting one of clock signals of at least two clock sources and providing the selected clock signal to a device of an integrated circuit that requires a clock source in order to operate. First, at least two clock sources that output clock signals are provided. Second, the integrated circuit is programmed to choose one of the clock signals designated by a programmed code. Third, the clock signals are detected to determine their availability. Fourth, the designated clock signal is selected when it is available. Otherwise, the undesignated clock signal is selected when it is available and when the designated clock signal is not available. And fifth, the selected clock signal is provided to the device.

These and other features and advantages of the present invention will be apparent from the figures as fully explained in the Detailed Description of the Preferred Embodiments.

BRIEF DESCRIPTION OF THE DRAWINGS

Other objects and features of the present invention and many of the attendant advantages of the present invention will be readily appreciated and become better understood by reference to the detailed description when considered in connection with the accompany drawings in which like reference numerals designate like parts throughout the figures thereof and wherein.

DETAILED DESCRIPTION OF THE PREFERRED EMBODIMENTS

Figure 1A:
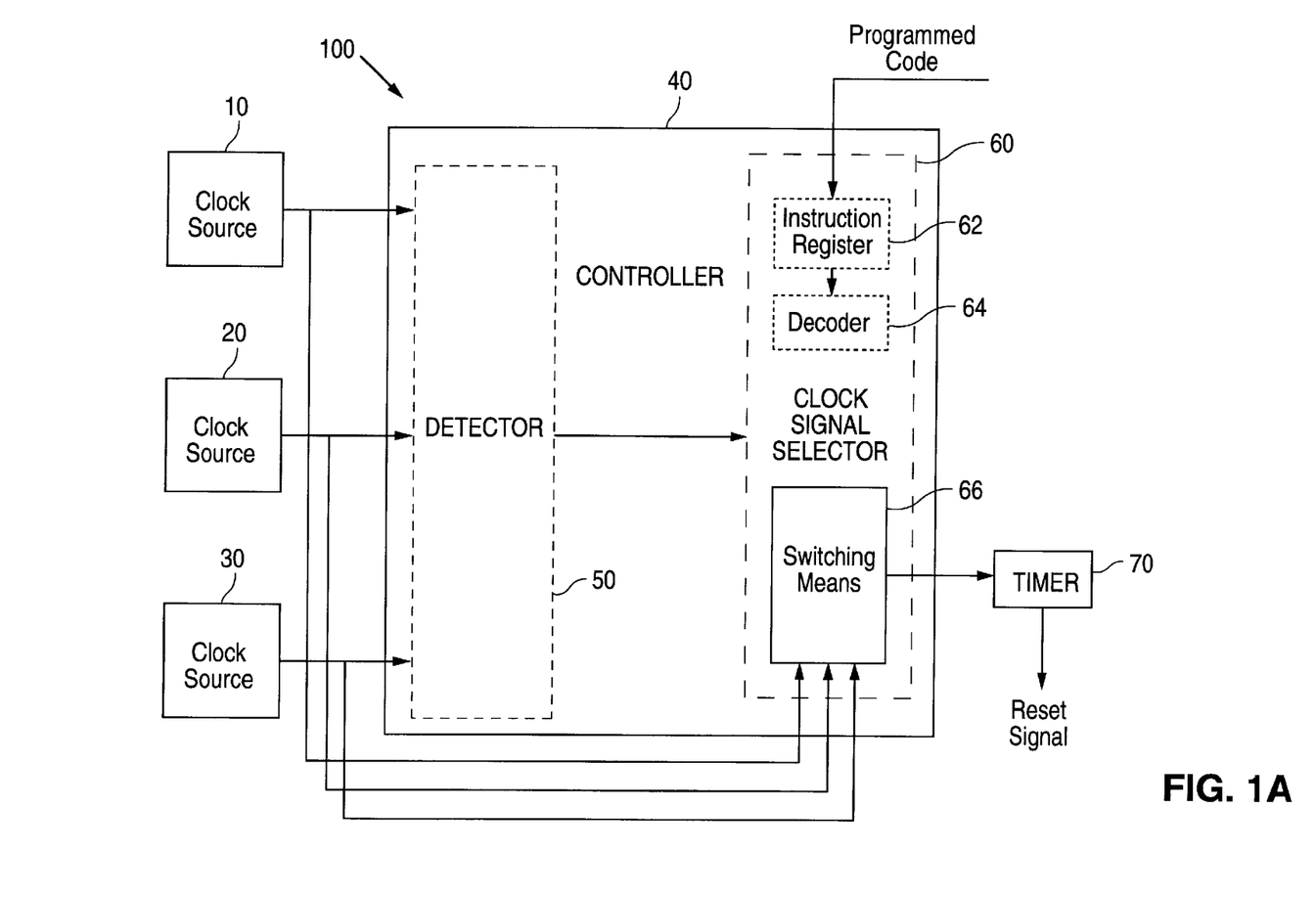
FIGS. 1A and 1B illustrate first and second preferred embodiments of the present inventive circuit for detecting and selecting clock sources. The circuit includes a controller having a detector and a clock signal selector. In the first preferred embodiment, the clock signal selector is coupled to a timer, and in the second preferred embodiment, the clock signal selector is coupled to a microprocessor.
Figure 1B:
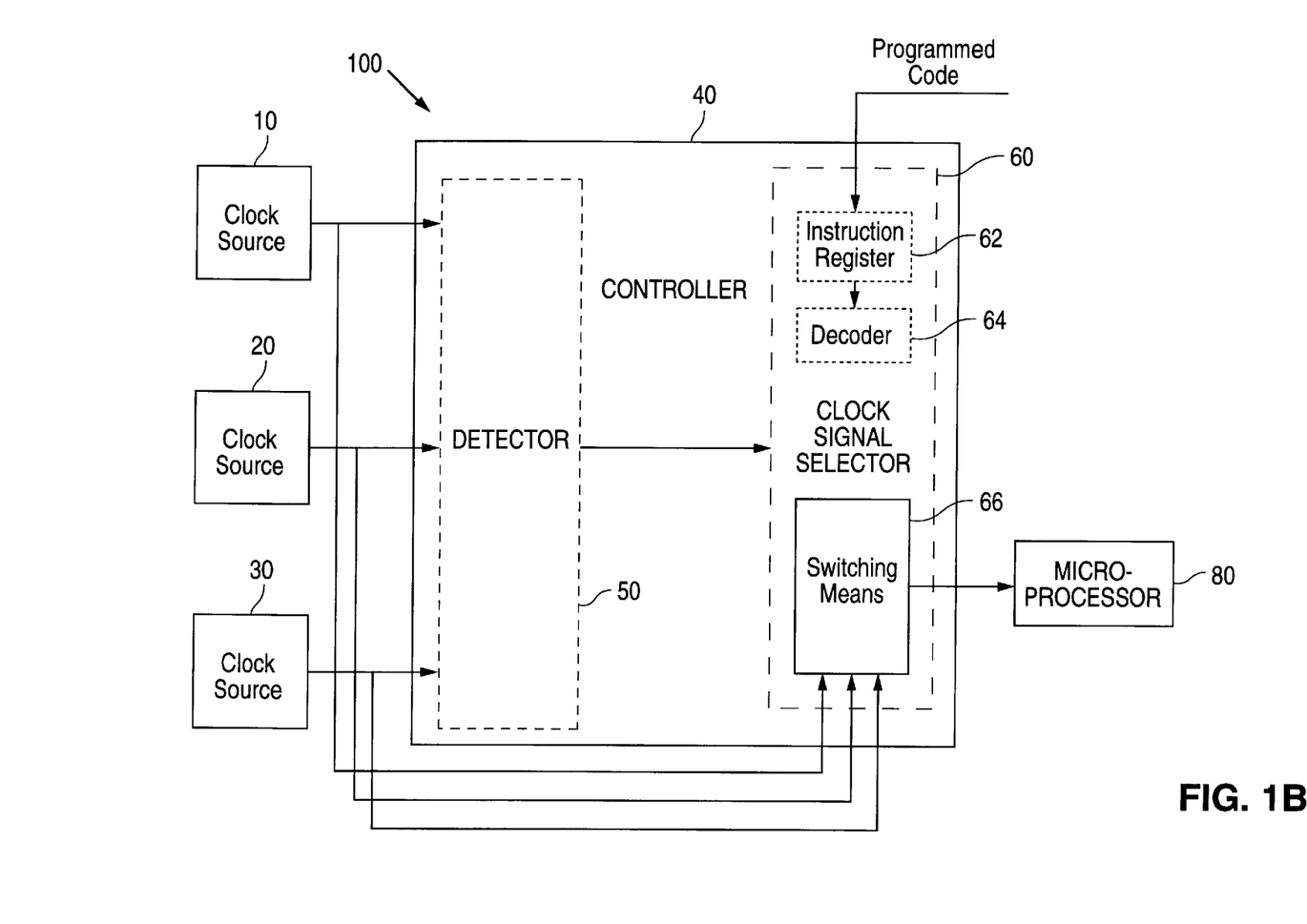

In FIG. 1A, a present inventive circuit 100 for detecting and selecting clock sources 10, 20 and 30 includes a controller 40 into which clock signals of the clock sources 10, 20 and 30 are inputted. Each of the clock signals resembles a clock signal 12 having pulses 14 illustrated by FIG. 2B. The controller 40 is programmable to choose one of the clock signals designated by a programmed code. The programmed code may include hardware logic, read-only-memory mask options, programmable memory options, wire-bonding options or other electronic means so as to choose one of the clock signals. Thereby, the controller 40 selects the designated clock signal when the controller 40 has received the designated clock signal. Otherwise, controller 40 automatically selects one of the undesignated clock signals when the designated clock signal has not been received and when at least one of the undesignated clock signals has been received. Finally, the controller 40 provides the selected clock signal to a counter or timer 70. It should be noted that the inventive circuit 100 maybe modified so as to provide the selected clock signal to any device that requires a clock signal in order to operate. Such a device may be a microprocessor 80 as shown in FIG. 1B, a digital signal processor, an application-specific integrated circuit, a reduced instruction set computer, or a microcontroller.

Referring again to FIG. 1A, the timer 70 may be a component of a microprocessor-based chip or an integrated circuit that also contains a microprocessor. If so, the timer 70 is preferably a watchdog timer that generates a signal to reset the microprocessor and disable the integrated circuit when the integrated circuit experiences a control failure or a lockup. In this embodiment, the programmed code received by the controller 40 designates the clock source 10 as a first choice for providing the clock signal to the timer 70. Thus, clock sources 20 and 30 are essentially safety means from which the timer 70 secures a clock signal in order to operate when the clock source 10 becomes malfunctioned and no longer generates any clock signal.

Regarding the controller 40, it may include a detector 50 and a clock signal selector 60, both of which receive the clock signals from the clock sources 10, 20 and 30. The detector 50 generates a clock source availability signal that indicates whether the clock signals of the clock sources 10, 20 and 30 have been received. Thereby, the clock source availability signal is provided to the clock signal selector 60 of the controller 40. In addition, the clock signal selector 60 is programmable to choose one of the clock signals designated by the programmed code. Based on the clock source availability signal and the programmed code, the clock signal selector 60 selects the designated clock signal when the designated clock signal has been received. Otherwise, the clock signal selector 60 automatically selects one of the undesignated clock signals when the designated clock signal has not been received and when at least one of the undesignated clock signals has been received.

Figure 2A:
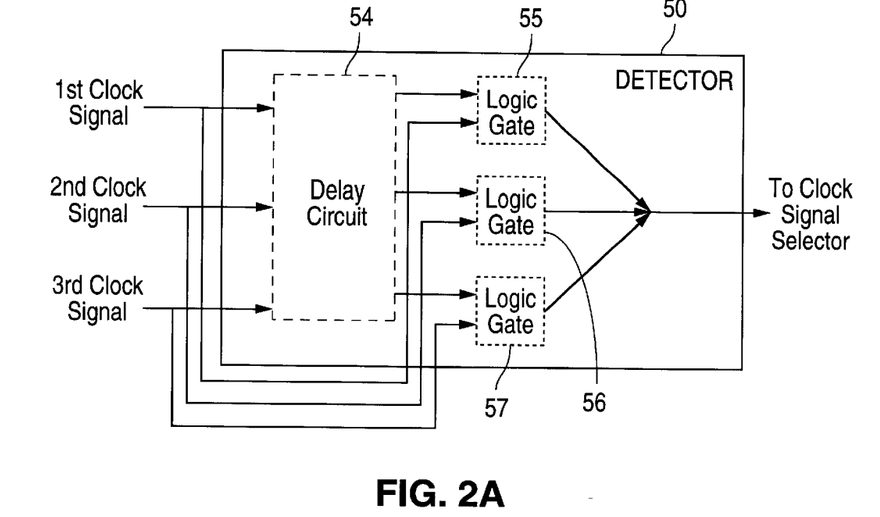
FIG. 2A illustrates one preferred embodiment of the detector of the controller of FIG. 1. The detector includes a delay circuit and various logic gates.
Figure 2B:
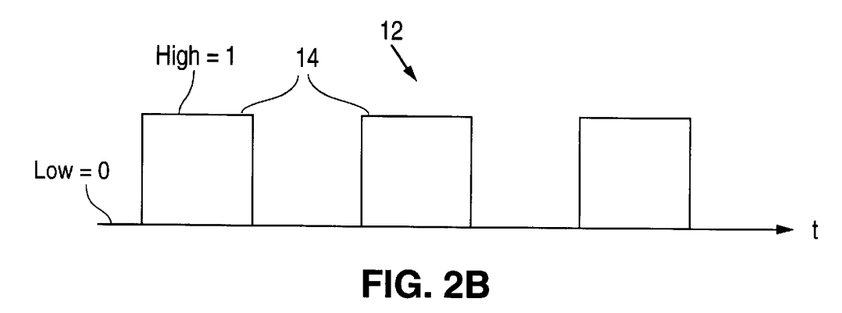
FIG. 2B illustrates an exemplary clock signal for inputting into the delay circuit of FIG. 2A.
Figure 2C:
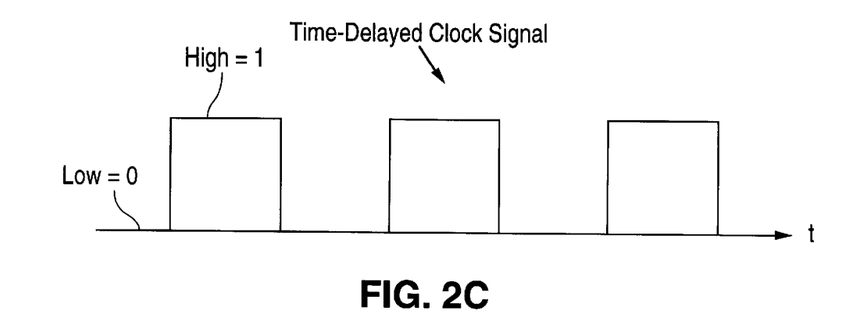
FIG. 2C illustrates an exemplary time-delayed clock signal representing an output of the delay circuit.

With respect to the detector 40, it may include a delay circuit 54 and three logic gates 55, 56 and 57 as illustrated by FIG. 2A. The delay circuit 54 receive first, second and third clock signals from the clock sources 10, 20 and 30 of FIG. 1, respectively. Similarly, the logic gates 55, 56 and 57 receive the first, second and third clock signals, respectively. After the delay circuit 54 receives the first, second and third clock signals (e.g., see FIG. 2B), it outputs three time-delayed clock signals (e.g., see FIG. 2C) to the logic gates 55, 56 and 57. Then, the logic gates 55, 56 and 57 respectively output first, second and third signals that indicate whether the first, second and third clock signals have been received, respectively. Thereby, the first, second and third signals are inputted into the clock signal selector 60 of FIG. 1. Alternatively, the first, second and third signals may be provided to respective low pass filters (not shown) that are respectively coupled between the logic gates 55, 56 and 57 and the clock signal selector 60 so as to output respective DC signals of the first, second and third signals as input signals to the clock signal selector 60. In the preferred embodiment, the logic gates 55, 56 and 57 may be either an exclusive OR gate or an exclusive NOR gate.

With respect to the clock signal selector 60, it may include an instruction latch or instruction register 62 for storing the programmed code within the clock signal selector 60, a decoder 64 for translating the content of the instruction register 62 to a meaningful operation or instruction, and a switching means 66 for receiving the clock signals from the clock sources 10, 20 and 30. Based on the received clock source availability signal and the received programmed code, the clock signal selector 60 generates and thereby provides a control signal to the switching means 66. In response, the switching means outputs one of the clock signals selected by the clock signal selector to the timer 70. In a preferred embodiment, the switching means is a multiplexer.

Referring to FIG. 1B, the microprocessor 80 may also be coupled to all three clock sources 10, 20 and 30 via the inventive circuit 100. For this embodiment, the above discussion regarding how the inventive circuit 100 of FIG. 1A operates applies here. It should also be noted that if only one of the clock sources 10, 20 and 30 is capable of providing accurate electrical signal frequencies and the programmed code designates such clock source as a first choice, it may not be desirable to employ the inventive circuit 100 in applications where the accuracy of the clock source is critical. The obvious reason is that the automatic selection of one of the undesignated and inaccurate clock sources when the designated clock source is not available, is undesirable. As a design choice, the controller 40 may be modified so as to output a warning signal to alert a microprocessor of a microprocessor-based system that the accurate clock source is no longer available. Based on a particular application, it may be desirable to pre-program the microprocessor 80 either to [1] shut down the microprocessor-based system or [2] select another clock source via the inventive circuit 100 when the microprocessor 80 receives the warning signal.

Figure 3A:
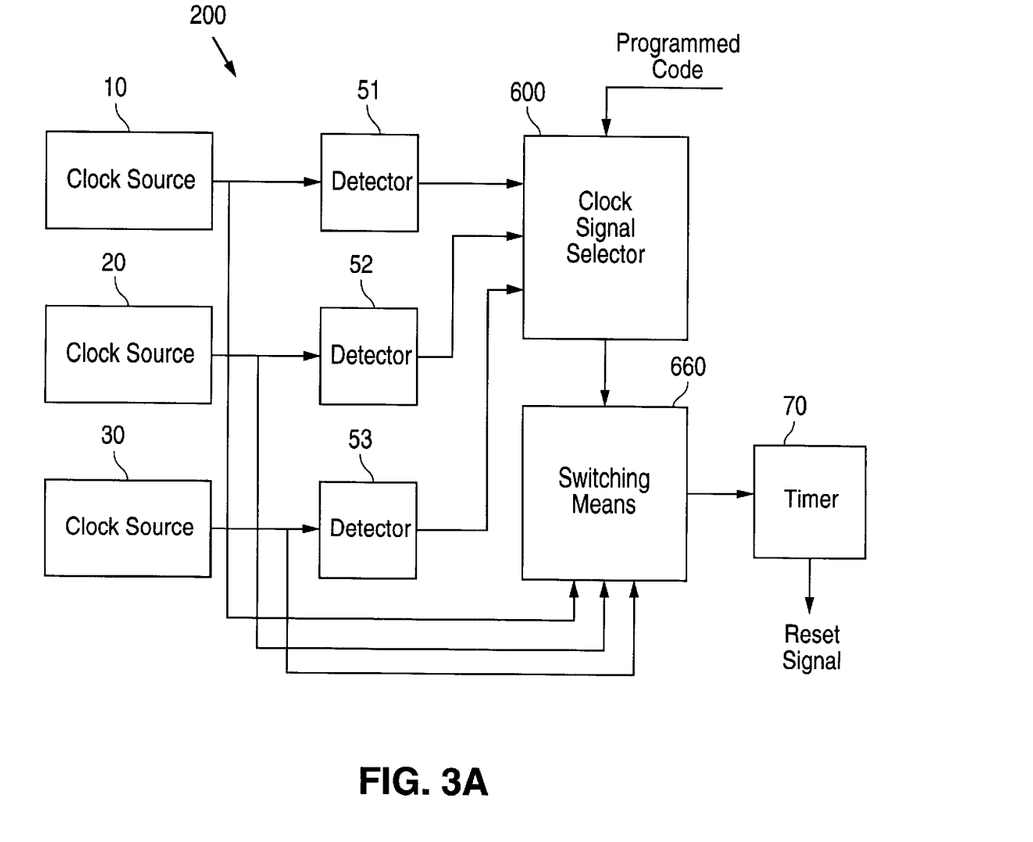
FIGS. 3A and 3B illustrate third and fourth preferred embodiments of the present inventive circuit. This circuit includes three detectors for three respective clock sources, a clock signal selector and a switching means. In the third preferred embodiment, the switching means is coupled to a timer, and in the second preferred embodiment, the switching means is coupled to a microprocessor.

FIG. 3A illustrates a second preferred embodiment of a present inventive circuit 200. Instead of only one detector, the circuit 200 includes three detectors 51, 52 and 53 for three clock sources 10, 20 and 30, respectively. Each of the detectors 51, 52 and 53 may have a delay circuit and a logic gate for detecting whether its respective clock source is available. The detectors 51, 52 and 53 individually provide a clock source availability signal to a clock signal selector 600. Unlike the circuit 100 of FIG. 1A, the clock signal selector 600 does not include a switching means 660. However, the clock signal selector 600 may include an instruction register and a decoder. The clock signal selector receives a programmed code that designates which clock signal should be selected. If the designated clock signal is available, the clock signal selector 600 generates a first control signal and provides it to the switching means that in response outputs the selected, designated clock signal to the timer 70. If the designated clock signal is not available, the clock signal selector 600 automatically selects one of the undesignated clock signals that have been received and thus are available. Based on this selection, the clock signal selector generates a second control signal and provides it to the switching means that in response outputs the selected, undesignated clock signal to the timer 70.

Figure 3B:
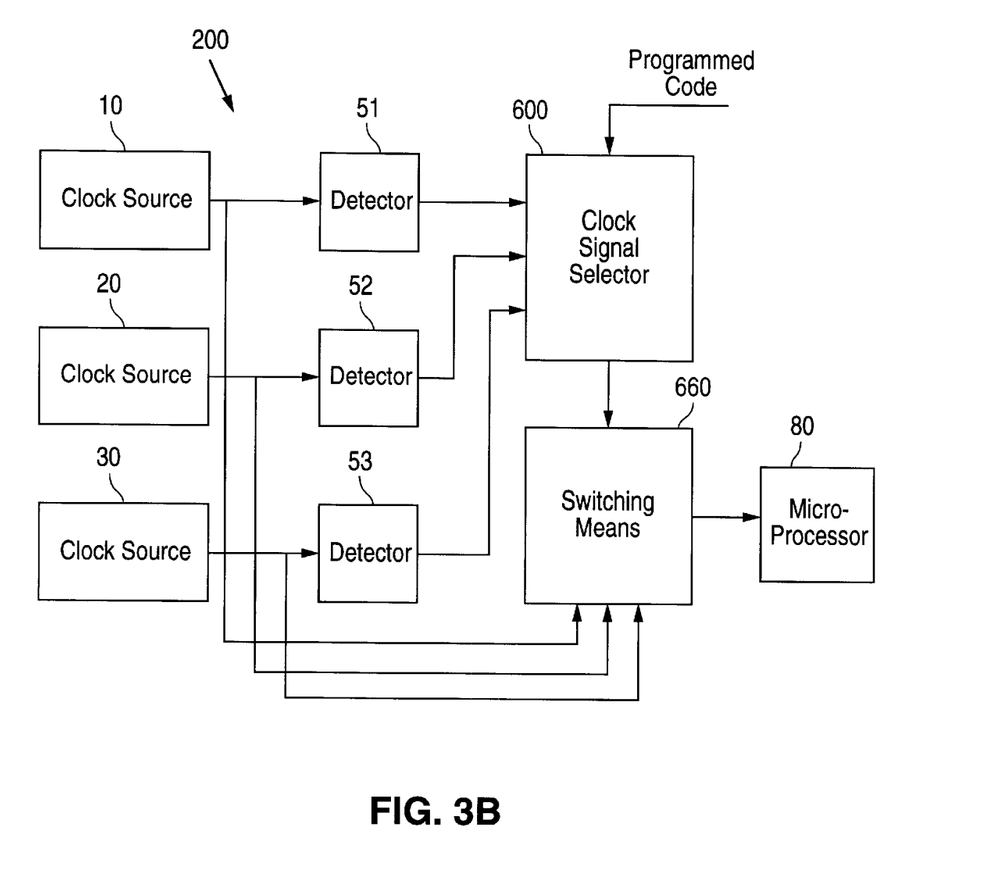

As an alternative, the microprocessor 80 may also be coupled to all three clock sources 10, 20 and 30 via the inventive circuit 200 as shown by FIG. 3B. For this embodiment, the above discussion of FIG. 3A regarding how the inventive circuit 200 operates applies here.

It should be noted that the circuits 100 and 200 may be modified to detect and select two clock sources or more than three clock sources. As the number of available clock sources increases, the probability that a watchdog timer or a microprocessor will not operate decreases exponentially. Furthermore, in addition to designating a clock signal from a specific clock source for a clock source selector to select, the programmed code may also instruct the clock signal selector to choose the undesignated clock signals based on priority and their availability when the designated clock signal is unavailable and when the undesignated clock signals are available.

TABLE 1

| | Programmed Functions & Priorities | | |
|---|---|---|---|
| Programmed Code | Priority #1 Clock Source | Priority #2 Clock Source | Priority #3 Clock Source |
| 000 | 10 | 20 | 30 |
| 001 | 10 | 30 | 20 |
| 010 | 20 | 10 | 30 |
| 011 | 20 | 30 | 10 |
| 100 | 30 | 10 | 20 |
| 101 | 30 | 20 | 10 |

Table 1 illustrates this priority scheme with respect to the three clock sources 10, 20 and 30. Table 1 shows an example of how the programmed code may be used to selectively select the clock sources 10, 20 and 30 based on priority. Two examples of how the clock signal selector of FIG. 1A functions based on the received programmed codes "000" and "011" are as follows.

First, if the instruction register of the clock signal selector receives the programmed code "000", the decoder of the clock signal selector would decode this programmed code so that the clock signal selector would select the clock signal from the clock source 10 when the clock source 10 is available regardless of whether the clock sources 20 and 30 are available or not. If the clock source 10 is not available, the clock signal selector would select the clock source 20 when the clock source 20 is available regardless of whether the clock source 30 is available or not. Only when both the clock sources 10 and 20 are not available, the clock signal selector would select the clock source 30.

Second, if the instruction register of the clock signal selector receives the programmed code "011", the decoder of the clock signal selector would decode this programmed code so that the clock signal selector would select the clock signal from the clock source 20 when the clock source 20 is available regardless of whether the clock sources 10 and 30 are available or not. If the clock source 20 is not available, the clock signal selector would select the clock source 30 when the clock source 30 is available regardless of whether the clock source 10 is available or not. Only when both the clock sources 20 and 30 are not available, the clock signal selector would select the clock source 10.

TABLE 2

| | Programmed Functions & Priorities | | | |
|---|---|---|---|---|
| Programmed Code | Priority #1 Clock Source | Priority #2 Clock Source | Priority #3 Clock Source | Priority #4 Clock Source |
| 00000 | 1 | 2 | 3 | 4 |
| 00001 | 1 | 2 | 4 | 3 |
| 00010 | 1 | 3 | 2 | 4 |
| 00011 | 1 | 3 | 4 | 2 |
| 00100 | 1 | 4 | 2 | 3 |
| 00101 | 1 | 4 | 3 | 2 |
| 00110 | 2 | 1 | 3 | 4 |
| 00111 | 2 | 1 | 4 | 3 |
| 01000 | 2 | 3 | 1 | 4 |
| 01001 | 2 | 3 | 4 | 1 |
| 01010 | 2 | 4 | 1 | 3 |
| 01011 | 2 | 4 | 3 | 1 |
| 01100 | 3 | 2 | 1 | 4 |
| 01101 | 3 | 2 | 4 | 1 |

TABLE 2-continued

| | Programmed Functions & Priorities | | | |
|---|---|---|---|---|
| Programmed Code | Priority #1 Clock Source | Priority #2 Clock Source | Priority #3 Clock Source | Priority #4 Clock Source |
| 01110 | 3 | 1 | 2 | 4 |
| 01111 | 3 | 1 | 4 | 2 |
| 10000 | 3 | 4 | 2 | 1 |
| 10001 | 3 | 4 | 1 | 2 |
| 10010 | 4 | 2 | 3 | 1 |
| 10011 | 4 | 2 | 1 | 3 |
| 10100 | 4 | 3 | 2 | 1 |
| 10101 | 4 | 3 | 1 | 2 |
| 10110 | 4 | 1 | 2 | 3 |
| 10111 | 4 | 1 | 3 | 2 |

Table 2 illustrates the priority scheme with respect to four clock sources 1–4. For example, if the instruction register of the clock signal selector receives a programmed code "01011", the decoder of the clock signal would decode this programmed code so that the clock signal selector would select the clock signal from the clock source 2 when the clock source 2 is available regardless of whether the clock sources 1, 3 and 4 are available or not. If the clock source 2 is not available, the clock signal selector would select the clock source 4 when the clock source 4 is available regardless of whether the clock sources 1 and 3 are available or not. If the clock sources 2 and 4 are not available, the clock signal selector would select the clock source 3 when the clock source 3 is available regardless of whether the clock source 1 is available or not. Only when all three clock sources 2–4 are not available, the clock signal selector would select the clock source 1.

The above described inventive circuits 100 and 200 are preferably a digital circuit. In addition, the present inventive concept may also be implemented as an analog circuit.

Figure 4:
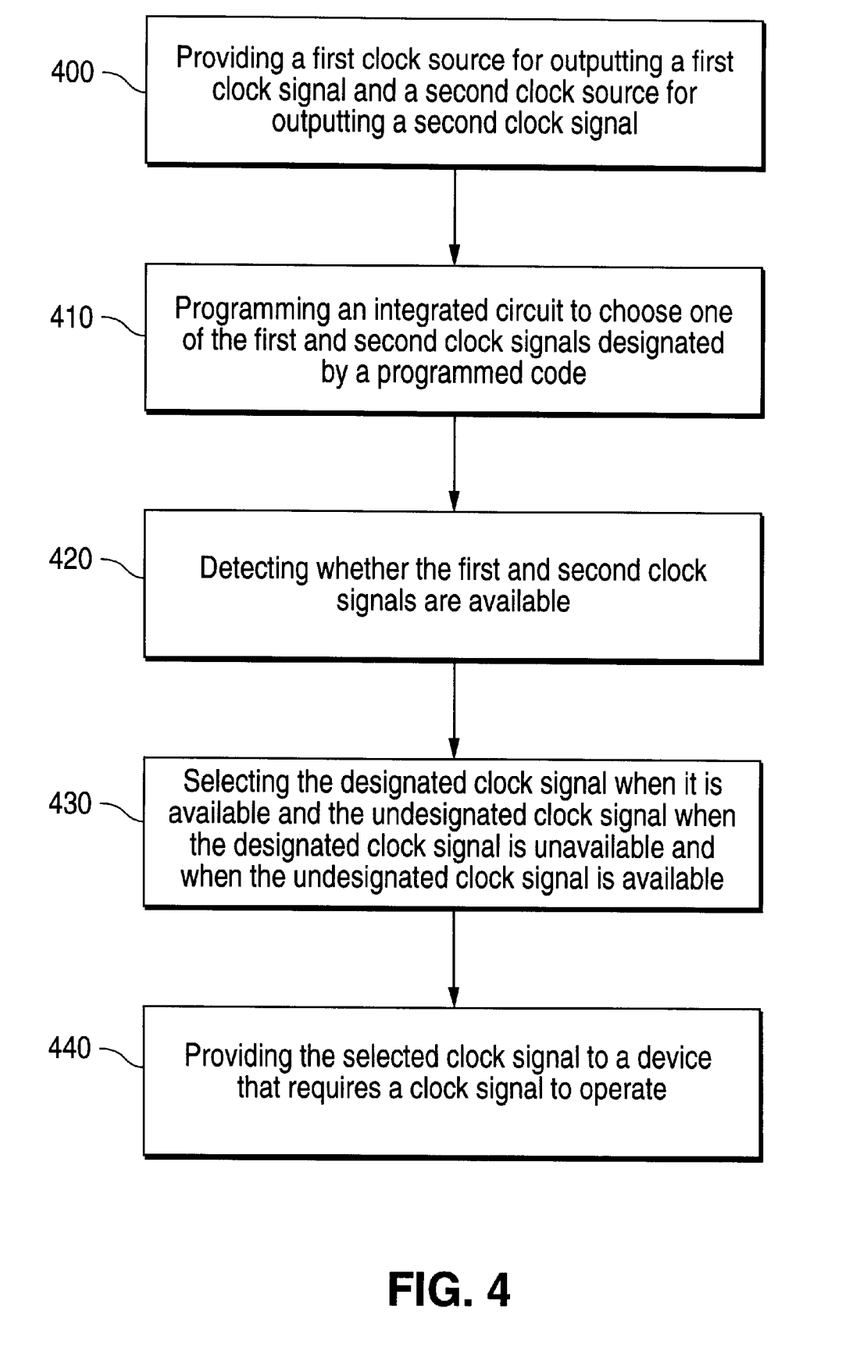
FIG. 4 illustrates the present inventive steps of a method for assuring clock pulses are provided to a device that requires such clock pulses in order to operate.

FIG. 4 illustrates the present inventive steps of a method for detecting and selecting one of clock signals of at least two clock sources and providing the selected clock signal to a device of an integrated circuit that requires a clock signal in order to operate. In step 400, a first clock source for outputting a first clock signal and a second clock source for outputting a second clock signal are provided.

Note that more than two clock sources may be provided in order to increase the probability that the device is constantly working. In step 410, the integrated circuit is programmed to choose one of the first and second clock signals designated by a programmed code. In step 420, the first and second clock signals are detected to determine their availability. In step 430, the designated clock signal is selected when it is available, and the undesignated clock signal is selected when the designated clock signal is unavailable and when the undesignated clock signal is available. In step 440, the selected clock signal is provided to the device. Such device may be a watchdog timer or a microprocessor of the integrated circuit.

With the present invention has been described in conjunction with several alternative embodiments, these embodiments are offered by way of illustration rather than by way of limitation. Those skilled in the art will be enabled by this disclosure to make various modifications and alterations to the embodiments described without departing from the spirit and scope of the present invention. Accordingly, these modifications and alterations are deemed to lie within the spirit and scope of the present invention as specified by the appended claims.

We claim:

1. A circuit for detecting and selecting one of clock signals of at least two clock sources, comprising:

a controller coupled to first and second clock sources of the at least two clock sources and programmable to choose one of first and second clock signals of the first and second clock sources designated by a first programmed code, wherein the controller selects the designated clock signal when the designated clock signal has been received, and further wherein the controller automatically selects the undesignated clock signal when the designated clock signal has not been received and the undesignated clock signal has been received.

2. The circuit of claim 1, wherein the controller is also coupled to a third clock source of the at least two clock sources so as to receive a third clock signal of the third clock source and is programmable to choose one of the first, second and third clock signals designated by a second programmed code, further wherein the controller selects the designated clock signal when the designated clock signal has been received, and further wherein the controller automatically selects one of the undesignated clock signals when the designated clock signal has not been received and when at least one of the undesignated clock signals has been received.

3. A circuit for detecting and selecting one of clock signals of at least two clock sources, comprising:

a detector coupled to first and second clock sources of the at least two clock sources and generating a first clock source availability signal that indicates whether the detector has received first and second clock signals of the first and second clock sources; and a clock signal selector coupled to the first and second clock sources and to the detector as so to receive the first clock source availability signal, wherein the clock signal selector is programmable to choose one of the first and second clock signals designated by a first programmed code, further wherein the clock signal selector selects the designated clock signal when the designated clock signal has been received, and further wherein the clock signal selector automatically selects the undesignated clock signal when the designated clock signal has not been received and the undesignated clock signal has been received.

4. The circuit of claim 3, wherein:

the detector and the clock signal selector are also coupled to a third clock source of the at least two clock sources so as to receive a third clock signal of the third clock source;

the detector generates a second clock source availability signal that indicates whether the first, second and third clock signals have been received, wherein the clock signal selector receives the second clock source availability signal;

the clock signal selector is programmable to choose one of the first, second and third clock signals designated by a second programmed code;

the clock signal selector selects the designated clock signal when the designated clock signal has been received; and the clock signal selector automatically selects one of the undesignated clock signals when the designated clock signal has not been received and when at least one of the undesignated clock signals has been received.

5. The circuit of claim 3, wherein the clock signal selector includes a switching means coupled to the first and second clock sources, further wherein the clock signal selector generates a first control signal based on the first programmed code and the first clock signal availability signal, and further wherein the switching means outputs one of the first and second clock signals in response to the first control signal.

6. The circuit of claim 4, wherein the clock signal selector includes a switching means coupled to the first, second and third clock sources, further wherein the clock signal selector generates a second control signal based on the second programmed code and the second clock signal availability signal, and further wherein the switching means outputs one of the first, second and third clock signals in response to the second control signal.

7. The circuit according to claim 5 or 6, wherein the switching means is a multiplexer.

8. The circuit according to claim 5 or 6, wherein the switching means outputs said one of the first and second clock signals to a device that requires a clock signal to operate.

9. The circuit of claim 8, wherein the device is a timer, a microprocessor, a digital signal processor, an application-specific integrated circuit, a reduced instruction set computer, or a microcontroller.

10. A circuit for detecting and selecting one clock signal of at least three clock sources, comprising:
 a detector coupled to receive a first clock signal from a first clock source, a second clock signal from a second clock source, and a third clock signal from a third clock source, the detector generating a clock source availability signal indicating if the detector has received the first, second, and third clock signals; and
 a clock signal selector coupled to receive the first, second, and third clock signals and to receive the clock source availability signal;
 wherein the clock signal selector is programmable with a code programmed to designate one of the first, second, and third clock signals, to select the designated clock signal if the designated clock signal has been received, and to automatically select an undesignated clock signal if the designated clock signal has not been received and if the undesignated clock signal has been received;
 wherein the clock signal selector generates a control signal based on the programmed code and the clock source availability signal; and
 wherein the clock signal selector includes a switching means coupled to receive the control signal and to receive the first, second, and third clock signals, the switching means outputting to a watchdog timer of an integrated circuit that contains a microprocessor one of the first, second, and third clock signals in response to the control signal, the watchdog timer requiring a clock signal to operate and generating a signal to reset the microprocessor and disable the integrated circuit when the integrated circuit experiences a control failure or a system lockup.

11. The circuit of claim 3, wherein the detector has first and second input terminals for receiving the respective first and second clock signals and generates two signals for respectively indicating whether the first and second clock signals have been received, and further wherein the first clock source availability signal includes said two signals.

12. The circuit of claim 4, wherein the detector has first, second and third input terminals for receiving the respective first, second and third clock signals and generates three signals for respectively indicating whether the first, second and third clock signals have been received, and further wherein the second clock source availability signal includes said three signals.

13. A circuit for detecting and selecting one of clock signals of at least two clock sources, comprising:
 a detector coupled to receive a first clock signal from a first clock source and a second clock signal from a second clock source, the detector generating a clock source availability signal indicating if the detector has received the first and second clock signals, wherein the detector comprises:
  a delay circuit receiving the first and second clock signals and outputting time-delayed first and second clock signals;
  a first logic gate receiving the first clock signal and the time-delayed first clock signal and outputting a first signal that indicates if the first clock signal has been received; and
  a second logic gate receiving the second clock signal and the time-delayed second clock signal and outputting a second signal that indicates if the second clock signals has been received, wherein the clock signal availability signal includes the first and second signals; and
 a clock signal selector coupled to receive the first and second clock signals and to receive the clock source availability signal, wherein the clock signal selector is programmable with a code programmed to designate one of the first and second clock signals, to select the designated clock signal if the designated clock signal has been received, and to automatically select the undesignated clock signal if the designated clock signal has not been received and the undesignated clock signal has been received.

14. The circuit of claim 13, wherein the first and second logic gates are an exclusive OR gate or an exclusive NOR gate.

15. A circuit for detecting and selecting one clock signal of at least three clock sources, comprising:
 a detector coupled to receive a first clock signal from a first clock source, a second clock signal from a second clock source, and a third clock signal from a third clock source, the detector generating a clock source availability signal indicating if the detector has received the first, second, and third clock signals, wherein the detector comprises:
  a delay circuit receiving the first, second, and third clock signals and outputting time-delayed first, second, and third clock signals;
  a first logic gate receiving the first clock signal and the time-delayed first clock signal and outputting a first signal that indicates if the first clock signal has been received; and
  a second logic gate receiving the second clock signal and the time-delayed second clock signal and outputting a second signal that indicates if the second clock signal has been received; and
  a third logic gate receiving the third clock signal and the time-delayed third clock signal and outputting a third signal that indicates if the third clock signal has been received, wherein the clock signal availability signal includes the first, second, and third signals; and
 a clock signal selector coupled to receive the first, second, and third clock signals and to receive the clock source availability signal, wherein the clock signal selector is programmable with a code programmed to designate one of the first, second, and third clock signals, to select the designated clock signal if the designated clock signal has been received, and to automatically select an undesignated clock signal if the designated clock signal has not been received and if the undesignated clock signal has been received.

16. The circuit of claim 15, wherein the first, second, and third logic gates are an exclusive OR gate or an exclusive NOR gate.

17. A circuit for detecting and selecting one clock signal of at least three clock sources, comprising:
   a detector coupled to receive a first clock signal from a first clock source, a second clock signal from a second clock source, and a third clock signal from a third clock source, the detector generating a clock source availability signal indicating if the detector has received the first, second, and third clock signals; and
   a clock signal selector coupled to receive the first, second, and third clock signals and to receive the clock source availability signal;
      wherein the clock signal selector is programmable with a code programmed to designate one of the first, second, and third clock signals, to select the designated clock signal if the designated clock signal has been received, and to automatically select an undesignated clock signal if the designated clock signal has not been received and if the undesignated clock signal has been received; and
      wherein the clock signal selector further includes an instruction register for storing the programmed code and a decoder for decoding the stored programmed code.

18. An integrated circuit coupled to at least two clock sources, said integrated circuit having a microprocessor and a timer, comprising:
   a controller coupled to first and second clock sources of the at least two clock sources and programmable to choose one of first and second clock signals of the first and second clock sources designated by a first programmed code, wherein the controller selects the designated clock signal when the designated clock signal has been received, further wherein the controller automatically selects the undesignated clock signal when the designated clock signal has not been received and the undesignated clock signal has been received, and further wherein the controller outputs the selected clock signal to the watchdog timer.

19. An integrated circuit coupled to at least two clock sources, comprising:
   a microprocessor;
   a watchdog timer; and
   a controller coupled to receive a first clock signal from a first clock source and a second clock signal from a second clock source;
   wherein the controller is programmable with a code programmed to designate one of the first and second clock signals, to select the designated clock signal if the designated clock signal has been received, and to automatically select an undesignated clock signal if the designated clock signal has not been received and if the undesignated clock signal has been received;
   wherein the controller outputs the selected clock signal to the watchdog timer; and
   wherein the timer generates a signal that resets the microprocessor and disables the integrated circuit when the integrated circuit experiences a control failure or a lockup.

20. The integrated circuit of claim 18, wherein the controller also outputs the selected clock signal to the microprocessor.

21. The integrated circuit of claim 18, wherein the controller is also coupled to a third clock source of the at least two clock sources so as to receive a third clock signal of the third clock source, wherein the controller is programmable to choose one of first, second and third clock signals designated by a second programmed code, further wherein the controller selects the designated clock signal when the designated clock signal has been received, further wherein the controller automatically selects one of the undesignated clock signals when the designated clock signal has not been received and when at least one of the undesignated clock signals has been received, and further wherein the controller outputs the selected clock signal to the timer.

22. The integrated circuit of claim 21, wherein the controller also outputs the selected clock signal to the microprocessor.

23. A method for detecting and selecting one of clock signals of at least two clock sources and providing the selected clock signal to a device of an integrated circuit, said device requiring a clock signal to operate, comprising:
   providing a first clock source for outputting a first clock signal and a second clock source for outputting a second clock signal, said first and second clock sources coupling to the integrated circuit;
   programming the integrated circuit to choose one of the first and second clock signals designated by a first programmed code;
   detecting whether the first and second clock signals are available;
   automatically selecting the designated clock signal when it is available and the undesignated clock signal when the designated clock signal is not available and the undesignated clock signal is available; and
   providing the selected clock signal to the device.

24. The method of claim 23, wherein:
   the providing step includes providing a third clock source for outputting a third clock signal;
   the programming step includes programming the integrated circuit to choose one of the first, second and third clock signals designated by a second programmed code;
   the detecting step includes detecting whether the first, second and third clock signals are available;
   the selecting step includes selecting the designated clock signal when it is available, and one of the undesignated clock signals when the designated clock signal is not available and at least one of the undesignated clock signals is available; and
   providing the selected clock signal to the device.

25. The method of claim 23, wherein the device is a watchdog timer or a microprocessor.

26. A circuit for detecting and selecting one of clock signals of at least two clock sources, comprising:
   a detector coupled to receive a first clock signal from a first clock source and a second clock signal from a second clock source, the detector generating a clock source availability signal indicating if the detector has received the first and second clock signals; and
   a clock signal selector coupled to receive the first and second clock signals and to receive the clock source availability signal;
      wherein the clock signal selector is programmable with a code programmed to designate one of the first and second clock signals, to select the designated clock signal if the designated clock signal has been received, and to automatically select the undesignated clock signal if the designated clock signal has not been received and the undesignated clock signal has been received;

wherein the clock signal selector generates a control signal based on the programmed code and the clock source availability signal; and wherein the clock signal selector includes a switching means coupled to receive the control signal and to receive the first and second clock signals, the switching means outputting to a watchdog timer of an integrated circuit that contains a microprocessor one of the first and second clock signals in response to the control signal, the watchdog timer requiring a clock signal to operate and generating a signal to reset the microprocessor and disable the integrated circuit if the integrated circuit experiences a control failure or a system lockup.

* * * * *